(12) United States Patent
Kantamsetty et al.

(10) Patent No.: US 10,810,358 B2
(45) Date of Patent: Oct. 20, 2020

(54) AUTOMATIC AND DYNAMIC GENERATION OF CUSTOMIZED COMPUTER USER INTERFACE SCREENS

(71) Applicant: FMR LLC, Boston, MA (US)

(72) Inventors: Prasant Kantamsetty, Boston, MA (US); Amit Gupta, Boston, MA (US); Jerry Mathew, Boston, MA (US); Subhash Nair, Boston, MA (US)

(73) Assignee: FMR LLC, Boston, MA (US)

( * ) Notice: Subject to any disclaimer, the term of this patent is extended or adjusted under 35 U.S.C. 154(b) by 104 days.

(21) Appl. No.: 16/173,246

(22) Filed: Oct. 29, 2018

(65) Prior Publication Data

US 2020/0134001 A1    Apr. 30, 2020

(51) Int. Cl.
| | |
|---|---|
| *G06F 40/14* | (2020.01) |
| *G06F 3/0482* | (2013.01) |
| *G06F 9/451* | (2018.01) |
| *G06F 16/22* | (2019.01) |

(52) U.S. Cl.
CPC ............ *G06F 40/14* (2020.01); *G06F 3/0482* (2013.01); *G06F 9/451* (2018.02); *G06F 16/2246* (2019.01)

(58) Field of Classification Search
CPC ...... G06F 40/14; G06F 9/451; G06F 16/2246; G06F 3/0482
See application file for complete search history.

(56) References Cited

U.S. PATENT DOCUMENTS

| | | | |
|---|---|---|---|
| 6,518,979 B1 | 2/2003 | Spertus et al. | |
| 2006/0041879 A1* | 2/2006 | Bower | G06F 9/451 717/162 |
| 2008/0263462 A1* | 10/2008 | Mayer-Ullmann | G06F 9/451 715/762 |
| 2014/0245196 A1 | 8/2014 | Zheng et al. | |
| 2014/0304214 A1* | 10/2014 | Sakunkoo | G06F 16/367 706/55 |

* cited by examiner

*Primary Examiner* — Roland J Casillas
(74) *Attorney, Agent, or Firm* — Proskauer Rose LLP

(57) ABSTRACT

Methods and systems are described for automatically rendering a customized user interface (UI). A server receives a request to generate a UI, the request including a user identifier and a workflow identifier. The server determines a template based upon the workflow identifier, comprising areas for insertion of custom UI elements. The server captures a list of UI nodes, each UI node comprising metadata. The server organizes the UI nodes into (i) a tree data structure comprising an anchor UI node and child UI nodes, and (ii) a table data structure of identifiers for the nodes in the tree structure, values, constraints, and the metadata for the corresponding UI node. The server inserts the metadata into the areas for insertion using the tree data structure and the table data structure. The server renders a graphical UI based upon the metadata.

16 Claims, 6 Drawing Sheets

```
export const NODES: Node[] = [
  {id: 1343, name: 'A', parentId: 1001, selectable: false, hasValue: false, hasGroup: false, value: ''},
  {id: 1454, name: 'B', parentId: 1343, selectable: false, hasValue: false, hasGroup: true,  value: ''},
  {id: 1354, name: 'C', parentId: 1454, selectable: false, hasValue: false, hasGroup: false, value: ''},
  {id: 1567, name: 'D', parentId: 1454, selectable: false, hasValue: false, hasGroup: false, value: ''},
  {id: 1866, name: 'E', parentId: 1567, selectable: false, hasValue: true,  hasGroup: false, value: ''},
  {id: 1678, name: 'F', parentId: 1567, selectable: false, hasValue: false, hasGroup: false, value: '10'},
];
```

AUTOMATIC AND DYNAMIC GENERATION OF CUSTOMIZED COMPUTER USER INTERFACE SCREENS

TECHNICAL FIELD

This application relates generally to methods and apparatuses, including computer program products, for automatic and dynamic generation of customized computer user interface (UI) screens.

BACKGROUND

There is an emerging need in computerized systems to provide for customized user interface experiences, tailored to a specific user and/or a specific application workflow. Generally, the rendering of user interfaces can leverage a hierarchical data structure, such as a tree structure where each node of the tree is associated with a user interface element. For example, the computing device that renders the user interface can traverse the tree structure to extract the information necessary to render the user interface design and data. This type of implementation can enable efficient generation of user interfaces, with auto-population of UI screen and document contents and adaptability to subsequent application changes.

However, there are several technical challenges that arise when rendering computerized user interfaces using a hierarchical data structure. First, user interface generation is typically most efficient when the underlying data is represented in a flat data structure (e.g., a table) versus a hierarchical structure—generally because the recursion algorithms required to traverse a tree structure tend to take longer as the hierarchical structure becomes deeper and more complex, which results in longer load times for user interfaces. Also, static documents or content in user interfaces typically cannot use a hierarchical structure for displaying information—these types of content require a flat data structure. Existing computerized techniques for accomplishing a dynamic user interface required specific user interface semantics (e.g., visual characteristics and the like) to be stored along with metadata around the user interface—which resulted in increased storage requirements and less adaptability and flexibility for changes to the data.

SUMMARY

Therefore, what is needed are methods and systems that can advantageously utilize the efficient user interface generation of a flat data structure in combination with the dynamic and customizable user interface generation of a hierarchical data structure. The methods and systems described herein beneficially overcome the technical deficiencies of existing user interface generation systems noted above to provide dynamic and customized computer user interface creation using a hyperconverged data structure—that comprises characteristics of both a hierarchical data structure and a flat data structure. The techniques described herein provide a more efficient and flexible computer user interface creation tool beyond currently-available computerized user interface generation systems. The innovative approach presented herein simply describes the data—and only the data—that needs to be rendered and interfaced with for data entry, as opposed to prior technology that requires describing user interface semantics within the metadata. The techniques described herein operate under the fundamental premise that representation of data can vary depending on, e.g., the rendering device, and any coupling between the description of data and a rendering device makes the technical architecture brittle and less efficient.

The invention, in one aspect, features a system for automatically rendering a customized user interface using hyperconverged data structures. The system comprises a server computing device having a memory for storing computer-executable instructions and a processor that executes the computer-executable instructions to receive, from a client computing device, a request to generate a user interface, the request including an identifier associated with a user of the client computing device and an identifier associated with an application workflow. The server computing device determines a user interface template based upon the identifier associated with the application workflow, the template comprising a layout of a user interface screen with one or more areas for insertion of custom user interface elements and associated with one or more rules for arranging the custom user interface elements. The server computing device captures a list of user interface nodes from a database, each user interface node comprising metadata for rendering a user interface element and including one or more values associated with the user interface element, each value having one or more constraints. The server computing device organizes the user interface nodes into (i) a tree data structure based upon the rules from the user interface template, the tree data structure comprising an anchor user interface node and a plurality of child user interface nodes and defining hierarchical relationships among the user interface nodes, and (ii) a table data structure comprising a list of the identifiers for the nodes in the tree structure, the values, the constraints, and the metadata for the corresponding user interface node. The server computing device inserts the metadata from the user interface nodes into the areas for insertion in the user interface template using the tree data structure and the table data structure. The server computing device renders a graphical user interface based upon the metadata contained in the user interface template for display at the client computing device and transmits the rendered graphical user interface to the client computing device in response to the request.

The invention, in another aspect, features a computerized method of automatically rendering a customized user interface using hyperconverged data structures. A server computing device receives, from a client computing device, a request to generate a user interface, the request including an identifier associated with a user of the client computing device and an identifier associated with an application workflow. The server computing device determines a user interface template based upon the identifier associated with the application workflow, the template comprising a layout of a user interface screen with one or more areas for insertion of custom user interface elements and associated with one or more rules for arranging the custom user interface elements. The server computing device captures a list of user interface nodes from a database, each user interface node comprising metadata for rendering a user interface element and including one or more values associated with the user interface element, each value having one or more constraints. The server computing device organizes the user interface nodes into (i) a tree data structure based upon the rules from the user interface template, the tree data structure comprising an anchor user interface node and a plurality of child user interface nodes and defining hierarchical relationships among the user interface nodes, and (ii) a table data structure comprising a list of the identifiers for the nodes in the tree structure, the values, the constraints, and the metadata for the corresponding user interface node. The server computing device inserts the metadata from the user interface nodes into the areas for insertion in the user interface template using the tree data structure and the table data structure. The server computing device inserts the metadata from the user interface nodes into the areas for insertion in the user interface template using the second tree structure and the table. The server computing device renders a graphical user interface based upon the metadata contained in the user interface template for display at the client computing device and transmits the rendered graphical user interface to the client computing device in response to the request.

Any of the above aspects can include one or more of the following features. In some embodiments, the one or more rules for arranging the custom user interface elements comprise a hierarchical relationship definition for two or more of the user interface nodes. In some embodiments, the hierarchical relationship definition comprises a parent user interface node and one or more child user interface nodes. In some embodiments, the one or more values for the user interface node comprise values for data entered into a user interface element associated with the user interface node. In some embodiments, the one or more constraints comprise data types for data entered into the user interface element associated with the user interface node.

In some embodiments, the server computing device retrieves one or more user-specific data elements based upon the identifier associated with a user of the client computing device and updates at least one of the values in the user interface nodes using the user-specific data elements. In some embodiments, inserting the metadata from the user interface nodes into the areas for insertion in the user interface template using the tree data structure and the table data structure comprises traversing the tree data structure to assign an identifier from each user interface node in the tree structure to a corresponding area for insertion in the user interface template, extracting the values, the constraints, and the metadata for each user interface node from the table data structure based upon the assigned identifier, and inserting the metadata for each user interface node into the corresponding area for insertion in the user interface template. In some embodiments, the anchor user interface node is a root of the tree data structure.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 5 is a diagram of a programmatic representation of a hyperconverged data structure that is generated by the UI data structure generation module.

DETAILED DESCRIPTION

Figure 1:
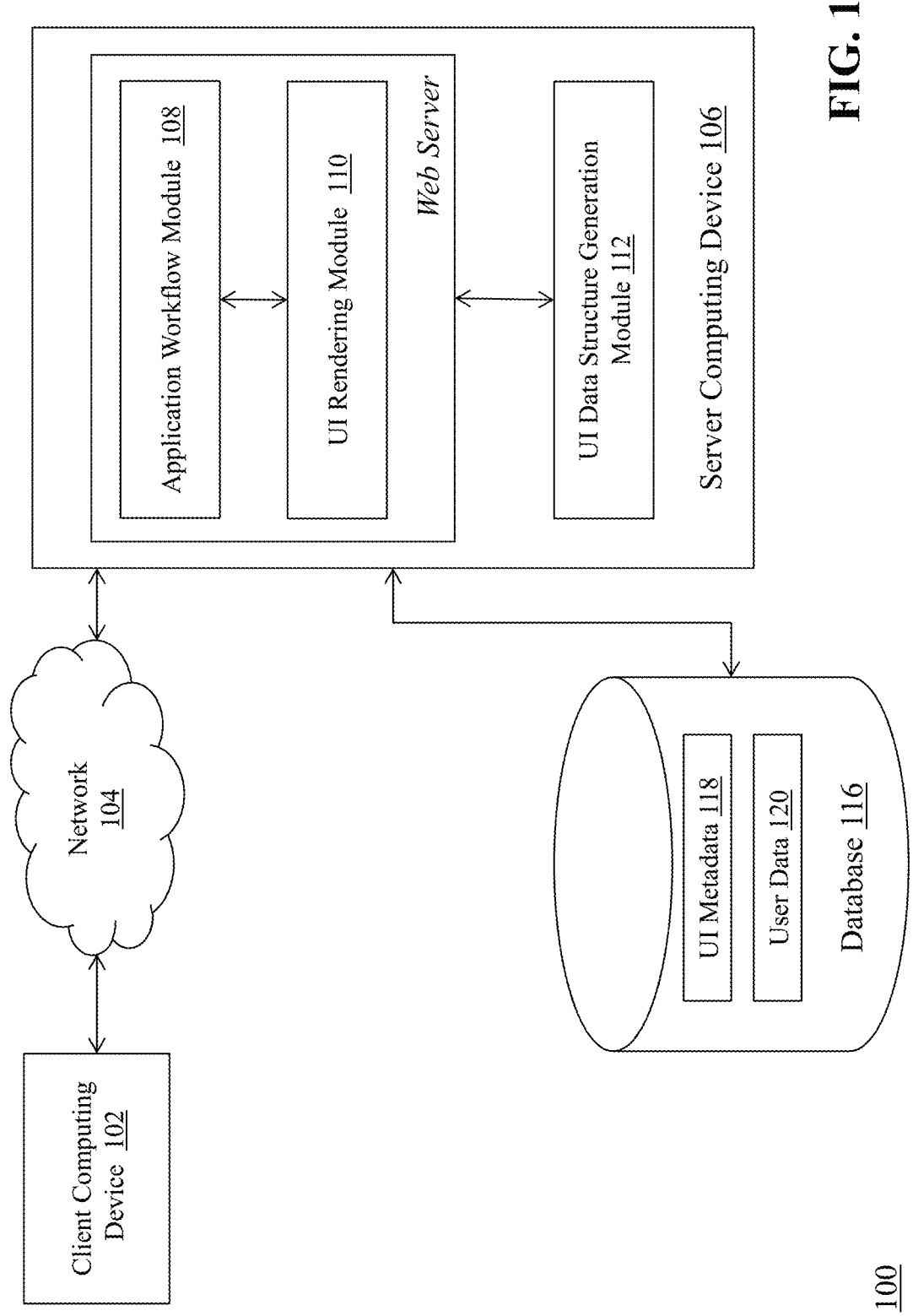
FIG. 1 is a block diagram of a system for automatically rendering a customized user interface using hyperconverged data structures.

FIG. 1 is a block diagram of a system 100 for automatically rendering a customized user interface using hyperconverged data structures. The system 100 includes a client computing device 102, a communications network 104, a server computing device 106 comprising an application workflow module 108, a user interface (UI) rendering module 110, and a UI data structure generation module 112, and a database 116 that stores UI metadata 118 and user data 120.

The client computing device 102 communicates with server computing device 106 for the purpose of, e.g., interacting with one or more server-based applications as will be described herein. Exemplary client devices 103 include but are not limited to desktop computers, laptop computers, tablets, mobile devices, smartphones, and internet appliances. It should be appreciated that other types of computing devices that are capable of connecting to the components of the system 100 can be used without departing from the scope of invention. Although FIG. 1 depicts a single client computing device 102, it should be appreciated that the system 100 can include any number of client computing devices. And as mentioned above, in some embodiments the client computing device 102 also includes a display for receiving data from the server computing device 106 and/or the database 116 and displaying data to a user of the client computing device 102.

The communication network 104 enables the other components of the system 100 to communicate with each other in order to perform the process of automatically rendering a customized user interface using hyperconverged data structures as described herein. The network 104 may be a local network, such as a LAN, or a wide area network, such as the Internet and/or a cellular network. In some embodiments, the network 104 is comprised of several discrete networks and/or sub-networks (e.g., cellular to Internet) that enable the components of the system 100 to communicate with each other.

The server computing device 106 is a computing device (or in some embodiments, a set of computing devices) that comprises a combination of hardware, including one or more processors and one or more physical memory modules, and specialized software engines and models that execute on the processor of the server computing device 106, to receive data from other components of the system 100, transmit data to other components of the system 100, and perform functions for automatically rendering a customized user interface using hyperconverged data structures as described herein. As mentioned above, the processor of the server computing device 106 executes an application workflow module 108, a UI rendering module 110, and a UI data structure generation module 112.

In some embodiments, the modules 108, 110, and 112 are specialized sets of computer software instructions programmed onto a dedicated processor in the server computing device 106 and can include specifically-designated memory locations and/or registers for executing the specialized computer software instructions. Although the modules 108, 110, and 112 are shown in FIG. 1 as executing within the same server computing device 106, in some embodiments the functionality of the modules 108, 110, and 112 can be distributed among a plurality of server computing devices. As shown in FIG. 1, the server computing device 106 enables the modules 108, 110, and 112 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of the modules 108, 110, and 112 is described in detail below.

The application workflow module 108 and UI rendering module 110 operate in conjunction with each other to receive requests from the client computing device 102 and generate user interface screens and/or electronic documents in response to the requests. In some embodiments, the application workflow module 108 and the UI rendering module 110 are part of an application web server that is hosted by the server computing device and that executes one or more software applications for use by the client computing device 102. In some embodiments, the software applications executed by the application web server can be operated by a user at the client computing device 102 using browser software located on the client computing device. Exemplary browser software includes, but is not limited to, Mozilla Firefox™ available from Mozilla Corp., Google Chrome™ available from Google Inc., Safari available from Apple Inc., and Microsoft Edge™ available from Microsoft Corp. For example, the client computing device 102 can launch browser software and connect to the web server using a particular Uniform Resource Identifier (URI), such as a web address or URL, to access one or more software applications (e.g., cloud-based applications, Software-as-a-Service (SaaS), and the like) provided by the server computing device 106.

In some embodiments, the application workflow module 108 establishes a connection with the client computing device 102 and manages the state of one or more software applications being used by the client computing device 102, including issuing requests to, and receiving data from, other computing devices and/or computing systems as part of an overall application workflow. For example, as a user at client computing device 102 accesses and navigates through a software application being provided by the server computing device 106, the client computing device 102 establishes a communication session with the application workflow module 108, which analyzes incoming requests from the client computing device 102 and takes corresponding action in response to the requests (e.g., retrieve information from database 116, instruct UI rendering module 110 to generate one or more user interface screens, generate one or more electronic documents for transmission to the client computing device 102, manage one or more workflows associated with the software application being accessed by the client computing device 102, and the like.

As explained above, the UI rendering module 110 generates one or more user interface screens for presentation on the client computing device 102 as part of a software application being provided by the server computing device 106. In some embodiments, the application workflow module 108 instructs the UI rendering module 110 to generate particular screens based upon a current state of an application workflow—e.g., when a user at client computing device 102 accesses a particular software function, the UI rendering module 110 generates and arranges the UI elements based upon the accessed function. As part of this process, the UI rendering module 110 requests UI template data from the UI data structure generation module 112 that the module 110 uses to render the UI, as described herein. Further detail on the template selection and UI rendering processes will be provided below.

The database 116 is a computing device (or in some embodiments, a set of computing devices) that is coupled to the server computing device 106 and is configured to receive, generate, and store specific segments of data relating to the process of automatically rendering a customized user interface using hyperconverged data structures as described herein. In some embodiments, all or a portion of the database 116 can be integrated with the server computing device 106 or be located on a separate computing device or devices. For example, the database 116 can comprise one or more databases, such as MySQL™ available from Oracle Corp. of Redwood City, Calif.

The database 116 includes UI metadata 118 and user data 120. The UI metadata 118 generally comprises data that describes, defines, or is otherwise associated with one or more UI elements that comprise a particular UI screen (or an electronic document). For example, the UI metadata 118 can include data about the type of each UI element (e.g., text field, table, drop-down, checkbox, etc.), the type of data that the UI element uses (e.g., integer, alphanumeric, Boolean, etc.), pre-defined and/or customized data that is filled in to a specific UI element, and so forth. As described herein, the UI metadata 118 is stored in the database 116 as a hyperconverged data structure—including a hierarchical data structure (e.g., tree) and a flat data structure—that defines the structure of the UI to be rendered by the UI rendering module 110.

The user data 120 generally comprises data that is associated with one or more users, including, e.g., user at client computing device 102. The user data 120 can be used by the modules 108, 110, 112 to customize specific UI elements and UI screens based upon the specific user that is accessing the software application. For example, the user data 120 can include demographic data, financial account data, employment status data, purchase history data, and other types of information that describe or relate to the user.

Figure 2:
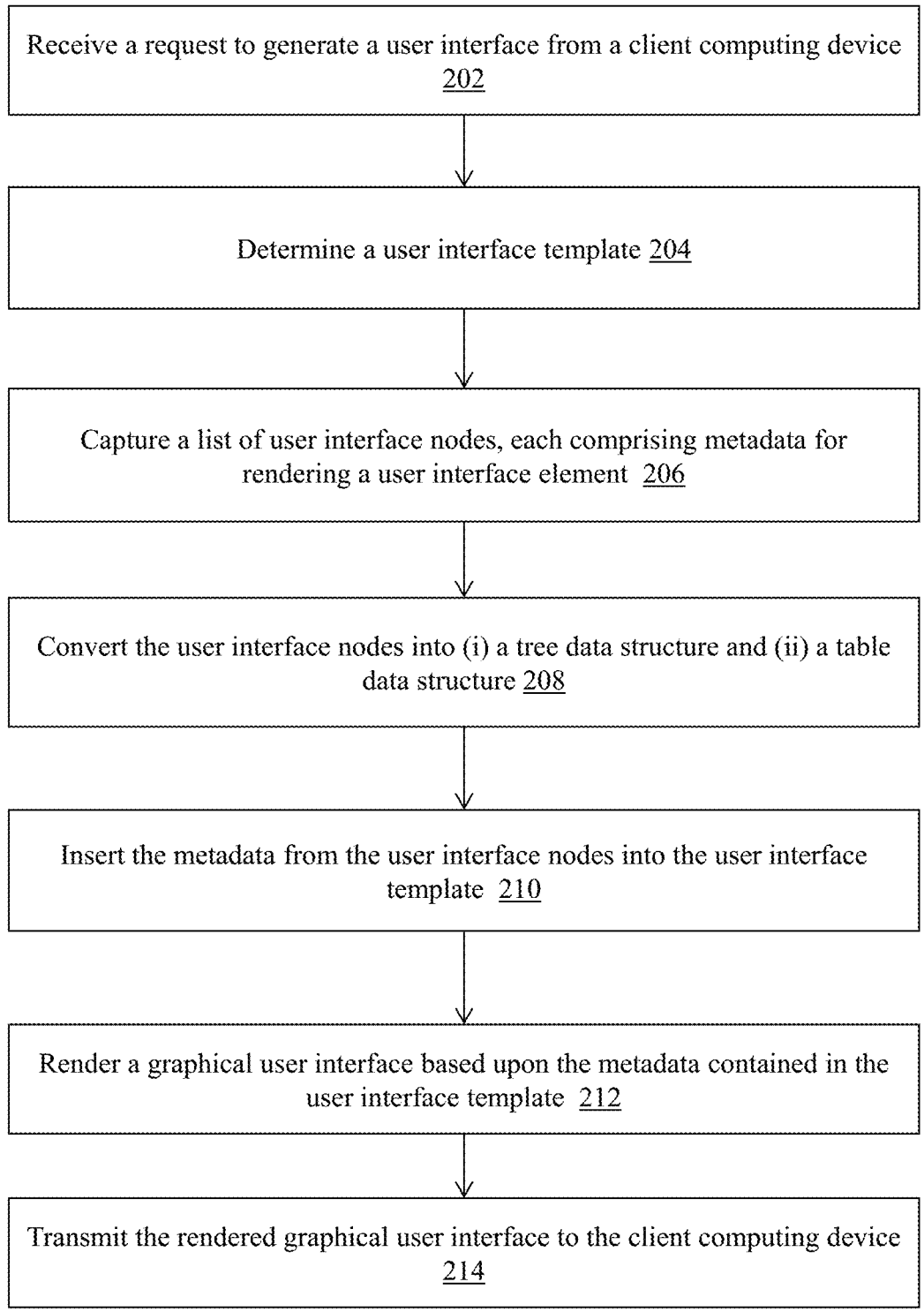
FIG. 2 is a flow diagram of a computerized method of automatically rendering a customized user interface using hyperconverged data structures.

FIG. 2 is a flow diagram of a computerized method 200 of automatically rendering a customized user interface using hyperconverged data structures, using the system 100 of FIG. 1. The application workflow module 108 of server computing device 106 receives a request from client computing device 102 to generate a user interface. As mentioned above, the client computing device 102 can establish a communication session with the module 108 to execute a software application being provided by the server computing device 106. In some embodiments, the request received from the client computing device 102 includes an identifier associated with a user of the client computing device (e.g., a username, account number, ID, etc.). The request can also include an identifier associated with an application workflow (e.g., an identifier for a particular software application and/or application function that is being requested by the client computing device 102). For example, the identifier associated with the application workflow can comprise a URI, URL, or other network address of the application and/or function requested by the client device 102. In another example, the identifier associated with the application workflow can comprise a numeric or alphanumeric identifier that is parsed by the application workflow module 108 to redirect the client computing device 102 to a specific software application or sub-application.

The application workflow module 108 transmits the application workflow identifier and the user identifier to the UI data structure generation module 112. The module 112 determines a user interface template based upon the identifier associated with the application workflow. For example, the UI data structure generation module 112 can search database 116 using the application workflow identifier to determine a particular UI template that is associated with the workflow. Generally a UI template comprises a layout of a user interface screen with one or more areas for insertion of custom user interface elements and associated with one or more rules for arranging the custom user interface elements. As will be described later, the UI rendering module 110 receives a completed instance of a UI template (also called a document) from the UI data structure generation module 112 to render the UI screen that is transmitted to the client computing device. Generally, the one or more rules for arranging the custom user interface elements can define relationships between the custom UI elements in the template. For example, if a first UI element is a category checkbox that has a plurality of sub-UI elements that are checkboxes each defining a specific item in the category, the rules for arranging the custom UI elements can define the hierarchy and/or ordering of the UI elements—so that the first UI element can be a parent to the plurality of sub-UI elements (e.g., children).

Figure 3:
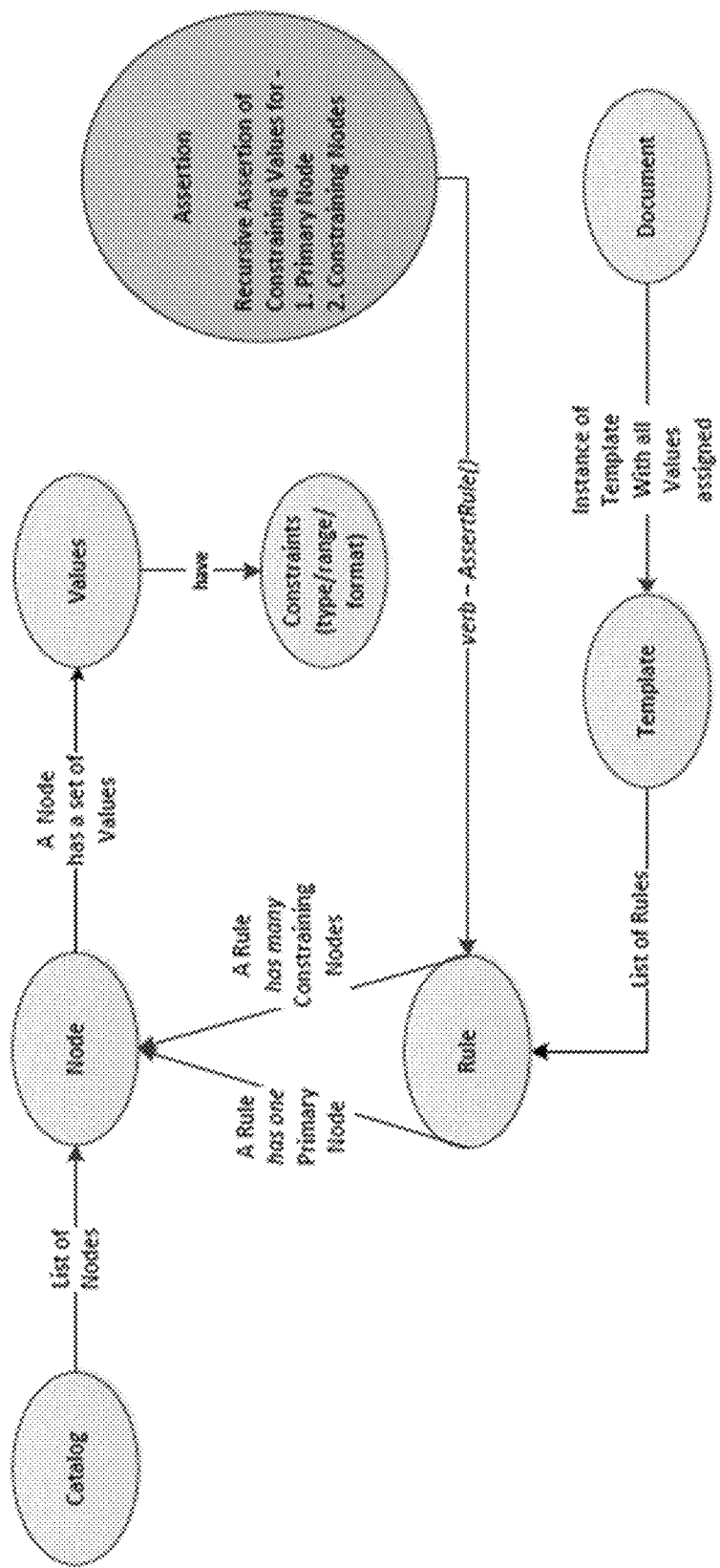
FIG. 3 is a diagram of the logical relationship between the various elements that make up a UI template used for rendering of a UI screen.

The UI data structure generation module 112 captures a list of user interface nodes from the UI metadata 118 of database 116, the nodes being associated with the application workflow identifier. In some embodiments, the list of user interface nodes is defined in the database 116 as a catalog. Generally, each user interface node comprises metadata for rendering a user interface element and including one or more values associated with the user interface element, each value having one or more constraints. For example, each user interface node can be associated with one UI element in the overall UI screen, and the one or more values for the node can define the type of UI element and/or type of data that is used in the UI element. The one or more constraints on the values can define limits on the attributes of the data being used in the UI element. FIG. 3 is a diagram of the logical relationship between the various elements that make up a UI template used for rendering of a UI screen, as described above.

Exemplary metadata for a user interface node is set forth below:

```
{
    "uniquealpha" : "PI3DigPlanNum",
    "nodetype " : "A",
    "name" : "Three Digit Plan Number",
    "levelid": 3,
    "dataType": "Integer",
    "selectChildMin": -1,
    "selectChildMax" : -1,
    "contextKey": false,
    "contextualRoot": false,
    "readOnly": false,
    "parentCode": "PlnInfo",
    "min": 1,
    "max": 500,
    "reqflag" : false,
    "minOccur": 0,
    "maxOccur": 1,
    "format": "xxx ( 3 digits )",
    "regExpression" : "^\\d{3}$",
    "lovlist" : [ ],
```

```
    "contextlist" : [ ],
    "tierlist" : [ ],
    "systemGeneratedOccurrences": -1,
    "defaultlovlist" : [ ],
    "order" : 3
}
```

Turning back to FIG. 2, after capturing the list of user interface nodes, the UI data structure generation module 112 converts the user interface nodes into (i) a tree data structure based upon the rules from the user interface template and (ii) a table, which together comprise the hyperconverged data structure. In some embodiments, the tree data structure comprises an anchor user interface node and a plurality of child user interface nodes and defining hierarchical relationships among the user interface nodes. Generally, the anchor user interface node is considered the 'root' of the corresponding tree structure and each of the plurality of child user interface nodes relates to the anchor user interface node either directly or via other child user interface nodes. Each of the user interface nodes in the tree data structure includes a unique identifier to distinguish the node from other nodes.

Below is an exemplary rendering algorithm of a user interface node structure:

```
export class Node {
    id: number;
    name: string;
    parentid: number;
    selectable: boolean;
    hasvalue: boolean;
    hasGroup: boolean;
    value: string
}
```

Node.component.html

```
<h2>Catalog Nodes </h2>
<ul class= nodes">
    <li *ngFor="let node of nodes"
        [class.selected]="node === selectedNode"
        (click)="onSelect(node)">
        <span class="badge">{{node.id}}        </span>
        <span class="badge">{{node.name}}      </span>
        <span class="badge1">{{node.parentid}} </span>
        <span class="badge2">{{node.selectable}}</span>
        <span class="badge2">{{node.hasvalue}} </span>
        <span class="badge3">{{node.value}}    </span>
        <span class="badge2">{{node.hasGroup}} </span>
    </li>
</ul>
<H4>getCatalogNodes completed!</H4>
<div *ngif="selectedNode">
    <h3>
        Selected Catalog Node ID : {{selectedNode.id}}
        <br>
        Selected Catalog Node Name: {{selectedNode.name | uppercase}}
        <br>
        Change    value                     <input [(ngModel)]="selectedNode.value" placeholder="value"/>
    </h3>
</div>
<div *ngif="selectedNodeHasGroup">
    <h3>Here because selected node has groups. </h3>
<div>
```

Figure 4:
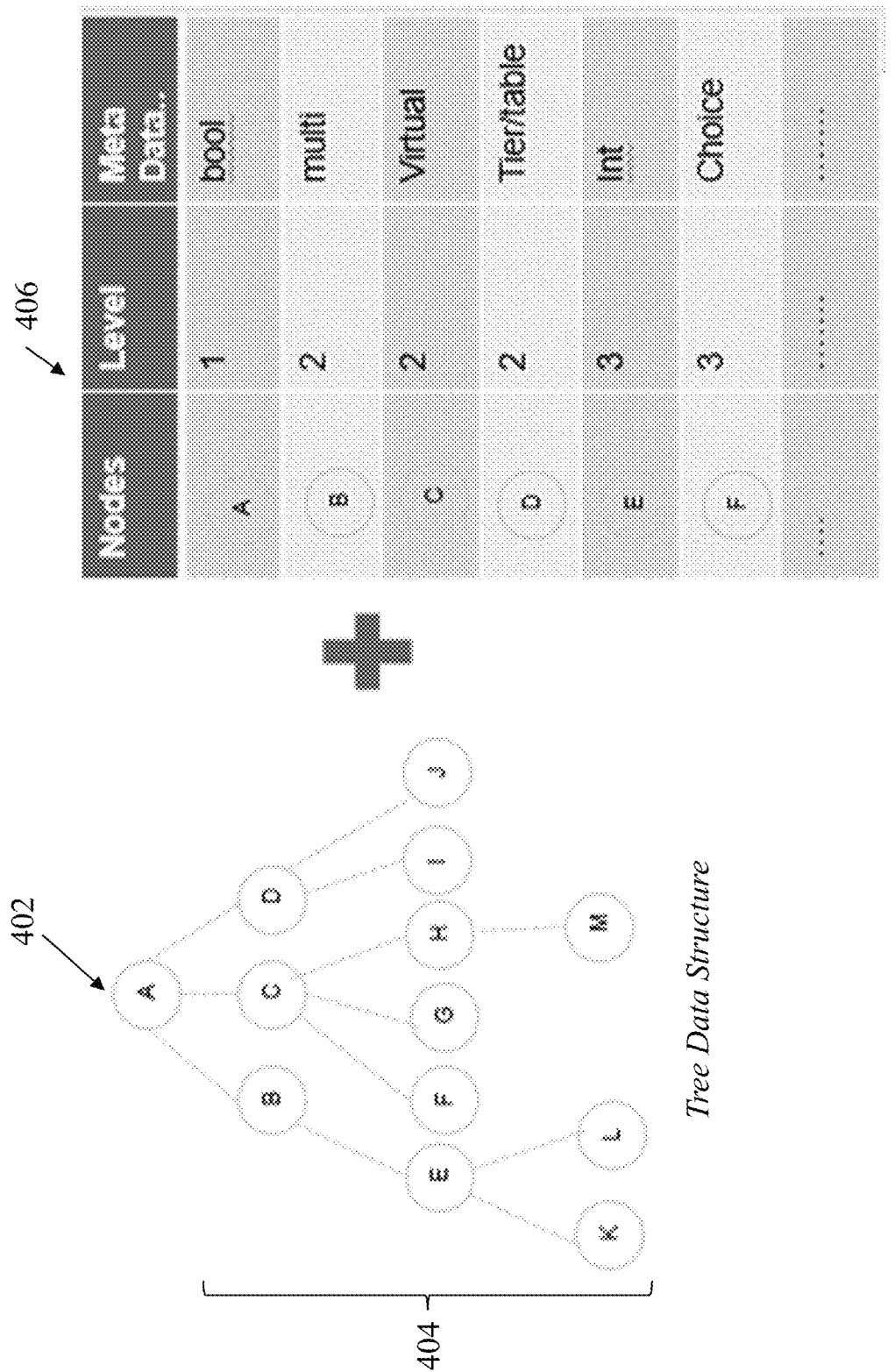
FIG. 4 is a diagram depicting a hyperconverged data structure that is generated by the UI data structure generation module.

The table comprises a list of the unique identifiers for the user interface nodes in the tree structure, and each row in the list includes the values, the constraints, and the metadata for the corresponding user interface node. In this way, the user interface nodes comprise a hierarchical data structure (i.e., a tree) and a flat data structure (i.e., a table) that are used together to complete the UI template for rendering of the associated UI. FIG. 4 is a diagram depicting the hyperconverged data structure that is generated by the UI data structure generation module 112. As shown in FIG. 4, the tree data structure comprises an anchor node 402 and a plurality of child nodes 404 that are connected via a hierarchical relationship. Each node 402, 404 includes an identifier (e.g., A, B, C . . . ) that uniquely identifies the individual node among the plurality. It should be appreciated that each node in the tree structure does not comprise metadata about the underlying UI element. Instead, that metadata is contained in a corresponding table 406, which includes metadata for each node, such as the unique identifier, a level which indicates the depth of the particular node in the tree structure (e.g., 1=anchor, etc.), and other metadata such as the UI element type, data type, and so forth. FIG. 5 is a diagram of a programmatic representation of a hyperconverged data structure that is generated by the UI data structure generation module Due to the nature of the hyperconverged data structure, the UI data structure generation module 112 can efficiently traverse the tree structure to identify the relationships between the UI elements without requiring extensive recursion algorithms to extract data from each node upon traversal, then leverage the corresponding table to quickly extract the necessary metadata for each UI element—so that the UI template can be completed automatically and without significant delay resulting while rendering the UI. The UI data structure generation module 112 inserts the metadata from the user interface nodes (as retrieved from the table) into the corresponding areas for insertion in the UI template to generate a completed UI template that has a plurality of UI elements with defined metadata. In some embodiments, the UI data structure generate module 112 can further select certain user data 120 from database for insertion into the UI template to generate a more customized, user-specific template. For example, the software application accessed by the client computing device 102 may relate to the user's retirement account and the application workflow may require the completion of an electronic plan contribution form by the user before processing an associated electronic transaction. The UI data structure generation module 112 can retrieve the user's demographic information (e.g., name, address, phone number) and/or the user's retirement account information (e.g., account number) and pre-fill those values into the appropriate UI elements—so that when the UI template is rendered by the UI rendering module 110, the UI screen has certain elements already complete. In another example, the user's employer may limit the user to have only certain types of compensation (e.g., regular pay, deferred compensation, etc.) eligible for automatic plan contributions based upon the specific plan available to the user. The UI data structure generation module 112 can determine the user's employer and/or plan requirements from database 116 and assign specific values to UI elements accordingly during completion of the UI template. For example, if the payroll deduction form includes checkboxes associated with the types of compensation that are eligible for selection by the user, the metadata can define which checkboxes are enabled and/or pre-checked. In some embodiments, the rendering step is a traversal of the list of nodes that contain the metadata—depending on the UI technology in use, rendering the appropriate UI widget is based on logic in the rendering module 110.

Figure 6:
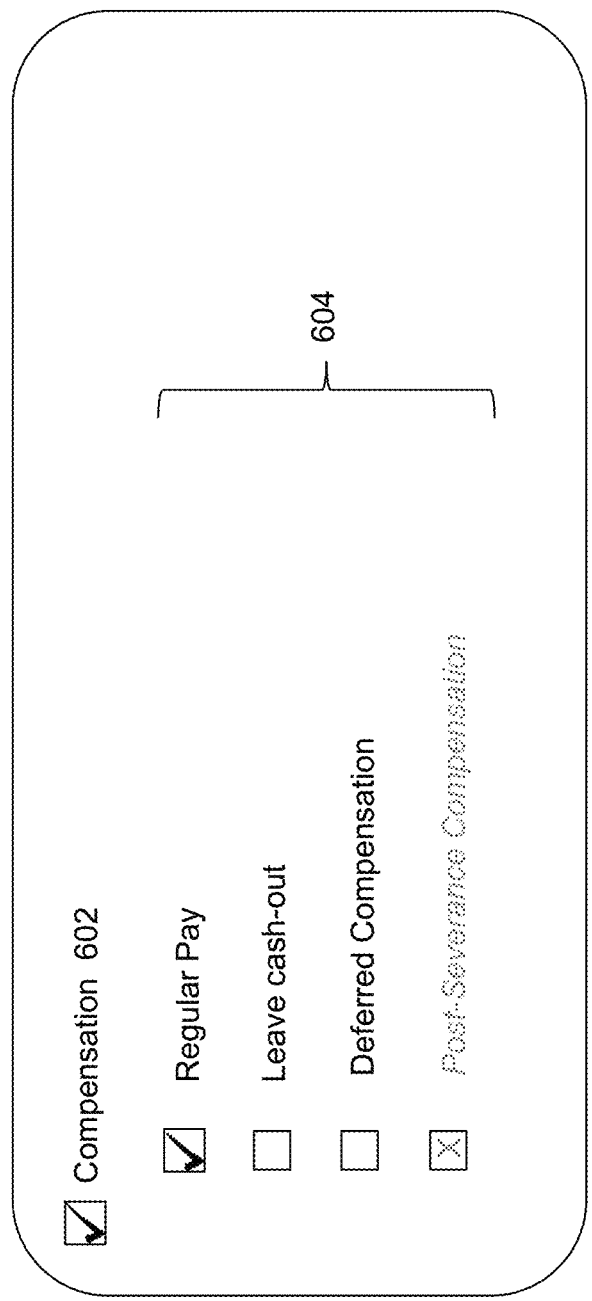
FIG. 6 is an example screenshot of a UI screen with certain UI elements pre-selected based upon the metadata associated with the UI elements.

FIG. 6 is an example screenshot of a UI screen with certain UI elements pre-selected based upon the metadata associated with the UI elements. As shown in FIG. 6, the Compensation checkbox 602 corresponds to an anchor user interface node, and each of the checkboxes 604 below the Compensation checkbox 602 correspond to a child user interface node below the anchor node. In this example, because the user's retirement plan allows for contributions from regular pay, leave cash-out, and deferred compensation, but not from post-severance compensation, the UI data structure generation module 112 completes the UI template to incorporate values that enable or disable the corresponding UI elements (i.e., checkboxes) automatically.

Once the UI template is completed, the UI data structure generation module 112 transmits the complete UI template to the UI rendering module 110, which traverses the UI template to render a graphical user interface based upon the metadata contained in the UI template for display at the client computing device 102. For example, in some embodiments the UI rendering module 110 generates programmatic code (e.g., HTML, XML) that corresponds to a particular UI screen associated with the UI template, and use the metadata for each UI element as contained in the UI template to render a customized user interface screen. The UI rendering module 110, in conjunction with the application workflow module 108, transmits the rendered graphical user interface to the client computing device 102 in response to the request.

Method steps can be performed by one or more special-purpose processors executing a computer program to perform functions of the invention by operating on input data and/or generating output data. Method steps can also be performed by, and an apparatus can be implemented as, special-purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special-purpose microprocessors. Generally, a processor receives instructions and data from a read-only memory or a random access memory or both. The essential elements of a computer are a specialized processor for executing instructions and one or more specifically-allocated memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for automatically rendering a customized computer graphical user interface screen using hyperconverged data structures, the system comprising:
a server computing device having a memory for storing computer-executable instructions and a processor that executes the computer-executable instructions to:
receive, from a client computing device, a request to generate a graphical user interface screen, the request including an identifier associated with a user of the client computing device and an identifier associated with an application workflow;
determine a user interface template based upon the identifier associated with the application workflow, the template comprising a layout of a graphical user interface screen with one or more areas for insertion of custom user interface elements and associated with one or more rules for arranging the custom user interface elements, the custom user interface elements comprising one or more input elements that enable a user of the client computing device to input information into the graphical user interface screen;
capture a list of user interface nodes from a database, each user interface node comprising metadata for rendering a user interface element and including one or more values associated with the user interface element, each value having one or more constraints;
convert the user interface nodes into (i) a tree data structure based upon the rules from the user interface template, the tree data structure comprising an anchor user interface node and a plurality of child user interface nodes and defining hierarchical relationships among the user interface nodes, each user interface node assigned a unique identifier, and (ii) a table data structure comprising a list of the identifiers for the nodes in the tree structure, the values, the constraints, and the metadata for the corresponding user interface node;
traverse the tree data structure based upon the defined hierarchical relationships and for each user interface node in the tree data structure:
locating the values, the constraints and the metadata for the user interface node in the table data structure using the unique identifier, and
inserting the captured values, constraints, and metadata into one or more of the areas of insertion in the user interface template to define one or more properties of a corresponding user interface element in the graphical user interface screen;

render the graphical user interface screen based upon the the user interface template for display at the client computing device; and transmit the rendered graphical user interface screen to the client computing device in response to the request.

2. The system of claim 1, wherein the one or more rules for arranging the custom user interface elements comprise a hierarchical relationship definition for two or more of the user interface nodes.

3. The system of claim 2, wherein the hierarchical relationship definition comprises a parent user interface node and one or more child user interface nodes.

4. The system of claim 1, wherein the one or more values for the user interface node comprise values for data entered into a user interface element associated with the user interface node.

5. The system of claim 4, wherein the one or more constraints comprise data types for data entered into the user interface element associated with the user interface node.

6. The system of claim 1, wherein the server computing device retrieves one or more user-specific data elements based upon the identifier associated with a user of the client computing device and updates at least one of the values in the user interface nodes using the user-specific data elements.

7. The system of claim 1, wherein the anchor user interface node is a root of the tree data structure.

8. The system of claim 1, wherein the one or more input elements that enable a user of the client computing device to input information into the graphical user interface screen comprise at least one of a checkbox, a drop-down, a text field, or a table.

9. A computerized method of automatically rendering a customized computer graphical user interface screen using hyperconverged data structures, the method comprising:

receiving, from a client computing device, a request to generate a graphical user interface screen, the request including an identifier associated with a user of the client computing device and an identifier associated with an application workflow;

determining, by the server computing device, a user interface template based upon the identifier associated with the application workflow, the template comprising a layout of a graphical user interface screen with one or more areas for insertion of custom user interface elements and associated with one or more rules for arranging the custom user interface elements, the custom user interface elements comprising one or more input elements that enable a user of the client computing device to input information into the graphical user interface screen;

capturing, by the server computing device, a list of user interface nodes from a database, each user interface node comprising metadata for rendering a user interface element and including one or more values associated with the user interface element, each value having one or more constraints;

converting, by the server computing device, the user interface nodes into (i) a tree data structure based upon the rules from the user interface template, the tree data structure comprising an anchor user interface node and a plurality of child user interface nodes and defining hierarchical relationships among the user interface nodes, each user interface node assigned a unique identifier, and (ii) a table data structure comprising a list of the identifiers for the nodes in the tree structure, the values, the constraints, and the metadata for the corresponding user interface node;

traversing, by the server computing device, the tree data structure based upon the defined hierarchical relationships and for each user interface node in the tree data structure:

locating the values, the constraints and the metadata for the user interface node from the table data structure using the unique identifier, and inserting the captured values, constraints, and metadata into one or more of the areas of insertion in the user interface template to define one or more properties of a corresponding user interface element in the graphical user interface screen the tree data structure and the table data structure;

rendering, by the server computing device, the graphical user interface screen based upon the user interface template for display at the client computing device; and transmitting, by the server computing device, the rendered graphical user interface screen to the client computing device in response to the request.

10. The method of claim 9, wherein the one or more rules for arranging the custom user interface elements comprise a hierarchical relationship definition for two or more of the user interface nodes.

11. The method of claim 10, wherein the hierarchical relationship definition comprises a parent user interface node and one or more child user interface nodes.

12. The method of claim 9, wherein the one or more values for the user interface node comprise values for data entered into a user interface element associated with the user interface node.

13. The method of claim 12, wherein the one or more constraints comprise data types for data entered into the user interface element associated with the user interface node.

14. The method of claim 9, wherein the server computing device retrieves one or more user-specific data elements based upon the identifier associated with a user of the client computing device and updates at least one of the values in the user interface nodes using the user-specific data elements.

15. The method of claim 9, wherein the anchor user interface node is a root of the tree data structure.

16. The method of claim 9, wherein the one or more input elements that enable a user of the client computing device to input information into the graphical user interface screen comprise at least one of a checkbox, a drop-down, a text field, or a table.

* * * * *